United States Patent Office 3,443,417
Patented May 13, 1969

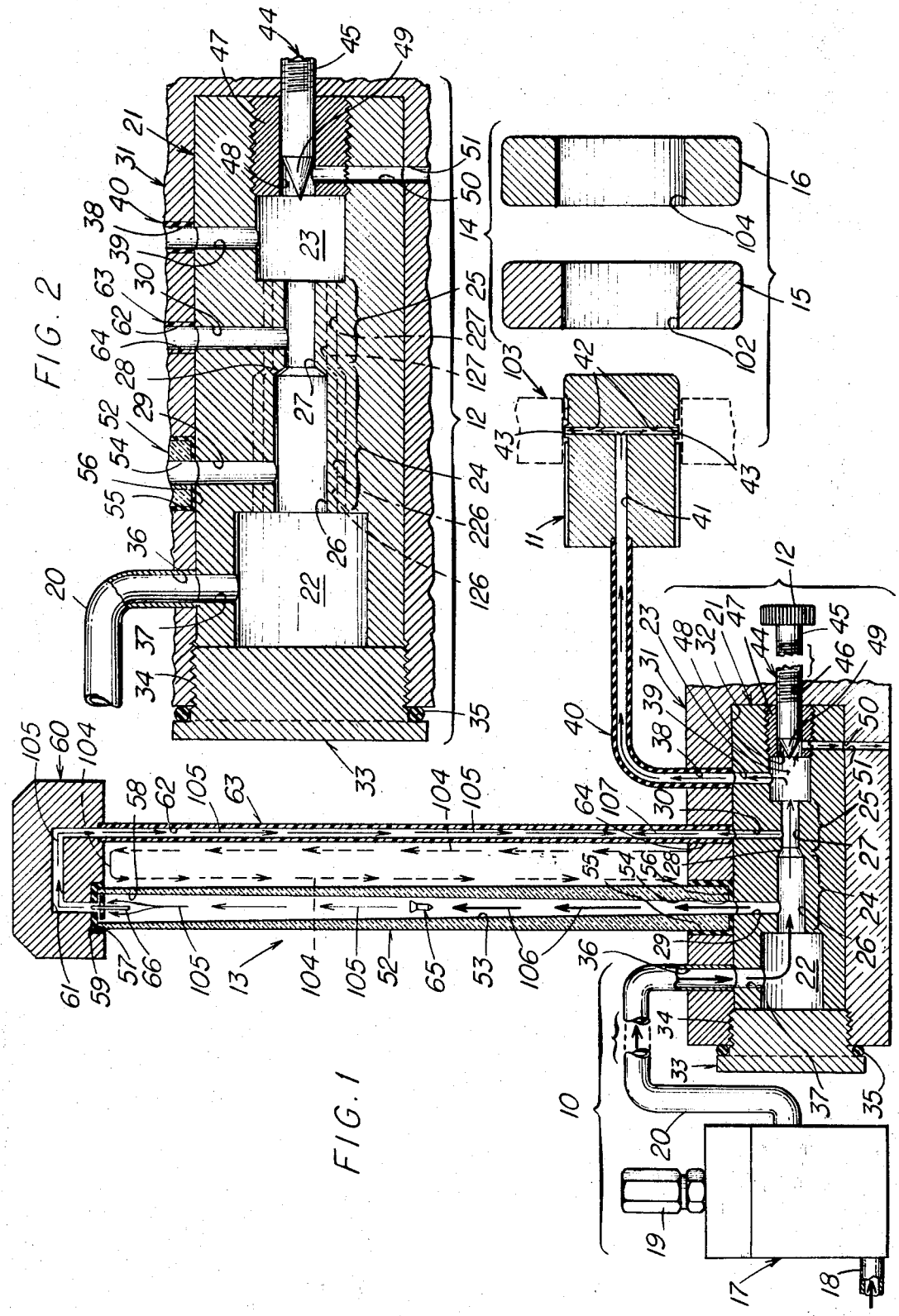

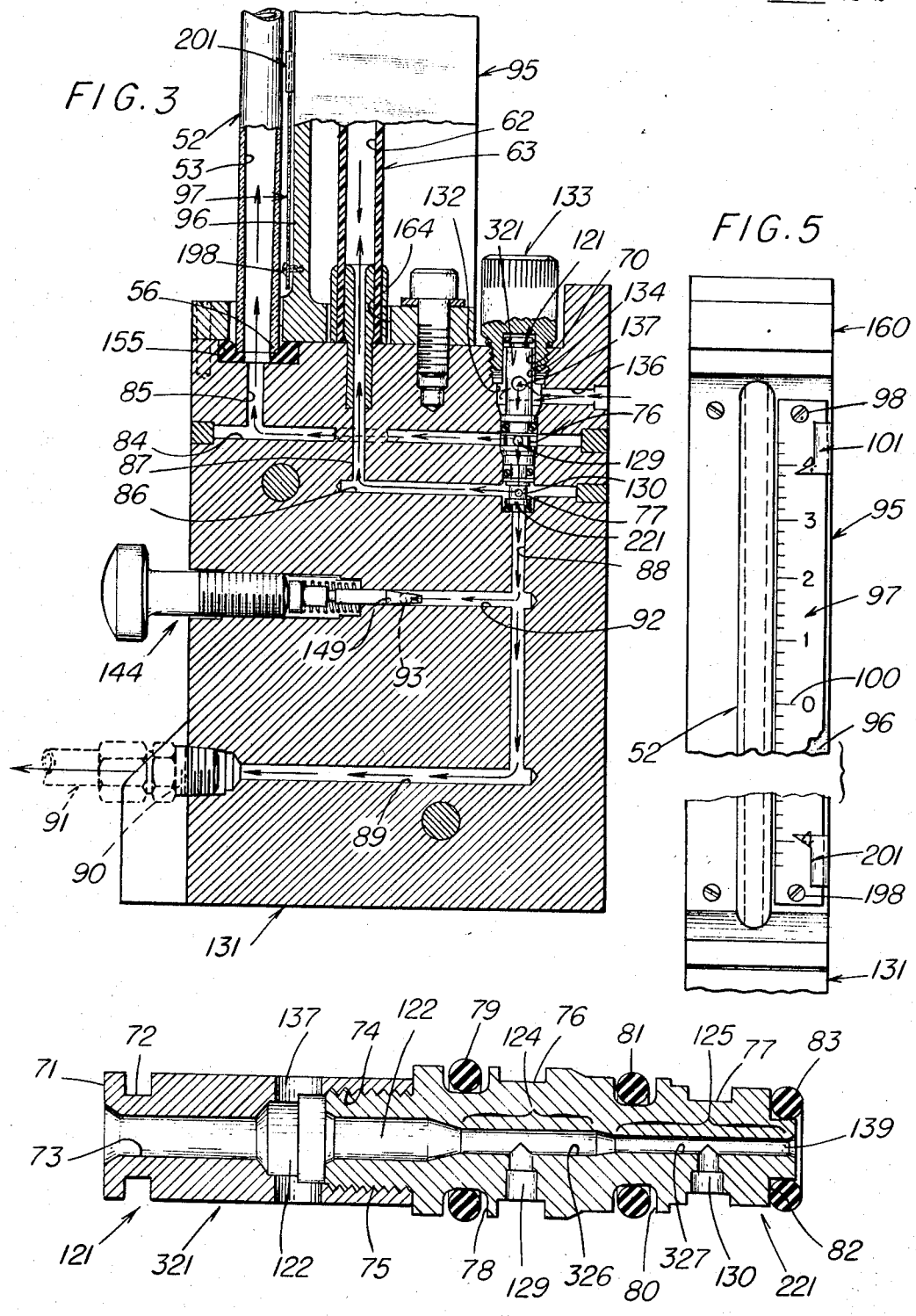

3,443,417
FLUID GAGE APPARATUS OF THE
ROTAMETER TYPE
Franklin Meyer, Jr., Forestdale, R.I., assignor to The
Taft-Peirce Manufacturing Company, Woonsocket, R.I.,
a corporation of Rhode Island
Filed Sept. 15, 1966, Ser. No. 579,566
Int. Cl. G01m 3/02
U.S. Cl. 73—37.9                               6 Claims

ABSTRACT OF THE DISCLOSURE

Fluid gage apparatus for gaging and comparing dimensions of workpieces includes a controllable pressure source of pressurized fluid, a gaging member equipped with nozzle means and a Venturi means. The Venturi means has a pair of through flow passage sections each providing one of a pair of constrictions having an entrance end and a discharge end. A pair of separate ducts are connected directly, respectively, to a side of one of the constrictions between the entrance end and discharge end of the latter. A rotameter with a float and scale has a longitudinal bore linearly tapered and is connected to the ducts. The rotameter is so connected to the ducts that a diversionary flow up through the rotameter is a fraction of the pressurized fluid flowing in the system. The gaging member is placed in a workpiece and the rotameter will give an indication of cooperation with a range of said scale.

---

The present invention relates to fluid gage apparatus for gaging and comparing dimensions of workpieces and, more particularly, those of the float-equipped fluid column or rotameter type employing a transparent, graduated, upright column or tube containing a free float or bob for measuring the flow of a fluid.

At least twenty years prior to the present invention a certain system was proposed for gaging and comparing dimensions of workpieces wherein such rotameter tube was employed as a combined metering device and indicator, and such proposal has been in widespread use during this period. In this system pressurized fluid, such as air at an elevated pressure, is supplied to the bottom smaller end of such a bob-carrying, upright indicating column or tube in which the opposed sides of the interior wall thereof diverge upwardly to a larger top end that in turn is connected directly to the metering nozzles of a gaging member with which the setting masters and workpieces are to be physically associated in the gaging and comparing procedures. For adjusting the position of the gaging span of the graduated scale associated with the tube in which the position of the float or bob is to rise and fall during the gaging procedure a zero setting valve is provided to bleed air to the atmosphere from the system between the top discharge end of the tube and the gaging member nozzles at an adjusted rate of flow determined by the setting of this valve. All of the air employed in such a system passes through the rotameter tube. Thus, in the use of this system appreciable amounts of moisture are prone to be condensed from out of the high velocity air passing up through this indicating tube onto the interior wall of the latter to interfere undesirably with the effectiveness of the employment thereof. This series circuit is not linear and in order to compensate for such non-linearity thereof it is common practice to provide with costly care and skill a non-uniform taper of the interior wall of the indicating tube. Desired changes in magnification attainable by such a series circuit require substitutions of the costly tube and its float or bob by different ones demanding tedious and considerable time-consuming procedure. Further, the range of sizes of the nozzles of the gaging members employed in such a series circuit is undesirably limited. The normal nozzle size for such a series circuit is 0.093 inch in diameter which dictates employment of undesirably large volumes of air to operate such a gage, and the employment of smaller nozzle sizes which may be demanded for certain design conditions makes it very difficult to maintain full magnification.

It is an object of the present invention efficiently to eliminate or appreciably minimize to tolerable limits such undesirable difficulties. An embodiment of the present invention accomplishes this end in an effective manner. By way of example such embodiment may employ physically the elements of the velocity fluid circuit of the Stead and Meyer United States Letters Patent No. 2,513,374 of July 14, 1950, with the exception that an indicating rotameter of the general type indicated above is substituted for the diaphragm-dial or manometer types of indicators proposed therein. In this embodiment of the invention the pressurized fluid supply is connected to the entrance end of a constriction-equipped flow passage extending through Venturi means with the discharge end of this passage connected to the nozzles of a gaging member. Each of a pair of successive sections of this through flow passage, which are arranged in successive through flow order between the fluid supply and gaging member, provides a flow constriction with the one connected directly to supply being larger in cross-section than is the one connected therebeyond to the gaging member. Each of these Venturi constrictions is provided between its entrance end and discharge end with a flow connecting side duct. An indicating rotameter has its internally tapered, bob-carrying, upright tube connected between the side ducts of these Venturi constrictions with the side duct of the larger constriction connected to the smaller bottom end of this tube and the larger top end of the latter connected to the side duct of the smaller constriction, for diversionary flow through this indicating tube of a fraction of the pressurized fluid. Since the operation of this velocity circuit is of a linear character the internal taper of the bore of the bob-carrying tube can be and is made linear, i.e., the taper is constant or uniform, which simplifies construction. Thus the bob-carrying indicating tube has associated therewith a longitudinal scale that carries equally spaced graduations which permit intermediate measurements to be read easily with accuracy. It is desirable that a practical commercially-operative form of this velocity gaging system, which may include as a pressurized fluid supply a source of air at elevated pressure, embody in the supply an adjustable pressure regulator for adjusting the magnification of this system.

Such a practical form of this velocity gaging system embodies the Venturi means in the form of a unit which is readily removable therefrom for simple replacement by another such unit having different characteristics. The scale is also made readily demountable relative to the bob-carrying indicating tube for easy replacement by another which is appropriate for the substituted Venturi unit. As a result, magnification of such embodiment of the present gaging system can be changed quickly in a few minutes without requiring replacement of the indicating tube or its float or bob.

Among the many advantages attainable by the use of this embodiment of the present invention are the following. An indicating rotameter is of much more simplified and thus economical construction that are indicators of the differential pressure diaphragm-dial and manometer types. Such a float-equipped fluid column type of indicator permits close grouping of a plurality alongside of each other so that the velocity systems embodying them may be used easily to check several different dimensions simultaneously, since one can readily shift reading attention from one to the other of the adjacent column type indicators. Much higher magnifications are easily attained with such a column type indicator than can be obtained with the diaphragm-dial type indicator; the latter permitting for a given design condition a maximum magnification adjustment of about thirty percent (30%) while the column type of indicator will allow for the same design condition more than twice that amount of adjustment and even up to one hundred percent (100%). In the present system only a small percentage of the total fluid or air flow supplied to the gaging circuit is diverted through the column indicator for readings while the Venturi means does the metering, thus greatly reducing the tendency for moisture accumulation in the float-equipped column indicator from that characteristic of the prior column indicator series system in which all of the air in large volume flows through the column indicator. A far greater range of nozzle sizes in the gaging members of velocity systems of the type of such embodiment of the present invention can be used than are permissible in the described series rotometer gaging system since full magnifications can be attained in the former even when very small nozzles of the order about 0.013″ in diameter are employed. The present velocity type of gaging system permits practical use of very slender air plug gaging members for measuring holes as small as 0.050″ in diameter. This velocity system permits instantaneous measuring without flutter or creep, there being no perceptible time lag in obtaining readings even though the discharge conduit means leading to the gaging member be many, e.g., thirty feet long; and this assures accuracy of finished products when such gage apparatus is employed for machine control. Accurate repeat readings are consistently attainable in spite of jarring or vibrating conditions which may prevail in the use of the present gage apparatus, and this velocity circuit allows realization of consistently greater accuracy than is possible in the operation of the other air gaging systems conventionally used commercially. The present velocity systems permit use of greater nozzle clearances, thus making possible longer life of the gaging members thereof, and additional operating economies are assured since the characteristic velocity principle demands a low rate of air consumption which be as little as ten cubic feet per hour.

A further object of the present invention is to provide structural embodiments of the apparatus which are readily constructed and permit efficient use and operation thereof.

The invention accordingly comprises the features of construction, combinations of elements, and arrangement of parts, which will be exemplified in the construtcitons hereinafter set forth.

Other objects of the invention will in part be obvious and will in part appear from reference to the following detailed description taken in connection with the accompanying drawings, wherein like numerals identify similar parts throughout, and in which:

FIG. 1 is a schematic view, partly in elevation and in axial section, of the embodiment of the present invention which connects the pair of Venturi constrictions in successive order or in series between the pressurized fluid supply and the nozzle means of the gaging member;

FIG. 2 is an enlarged axial section, with parts broken away and a few others shown in elevation, of the Venturi means and the removable mount thereof shown in FIG. 1, indicating in broken lines Venturi constrictions differing from those shown in full lines to illustrate variations attainable by replacement of the Venturi unit in a receptive chamber of casing means;

FIG. 3 is a vertical section, with some parts broken away and others shown in elevation, of a commercial form of the embodiment illustrated in FIGS. 1 and 2;

FIG. 4 is an enlarged axial section of the Venturi unit which is removably mounted in the casing chamber of the FIG. 3 structure; and FIG. 5 is a front elevation view, with parts broken away, of the rotameter or float-equipped fluid columnmeter and its associated scale embodied in the structure of FIG. 3.

As will be seen from FIGS. 1 and 2 the fluid gage apparatus therein schematically illustrated comprises a controllable pressure source of pressurized fluid, such as air, therein referenced 10, a gaging member 11 equipped with nozzle means, intervening Venturi means 12, and a rotameter 13. At 14 are illustrated a minimum setting master ring 15 and a maximum setting master ring 16.

The controllable pressure source 10 of pressurized fluid or air includes a pressure regulator 17 connected by a supply conduit 18 which preferably is connected through a suitable filter (not shown) to a source of compressed air supply, the pressure of which may be between about 30 and 150 p.s.i. Beneath the protective cover cap 19 is located a pressure regulator screw for adjusting the pressure of the air supplied to the Venturi structure. Supply conduit means 20, which may be a suitable hose, connects the output of the pressure regulator 17 to the Venturi structure 12.

The Venturi means or structure 12 includes a Venturi body 21 which constitutes a replaceable Venturi unit. The Venturi unit 21 preferably may be in the form of a cylindrical body and has a through flow passage, which may be provided by a counterbored axial bore having an enlarged entrance end 22 and an enlarged discharged end 23. The through flow passage bore is provided between its entrance end 22 and its discharge end 23 with a pair of sections 24 and 25 provided as successive coaxial bores to define a larger upstream Venturi constriction 26 and a smaller downstream Venturi constriction 27. The entrance end of the Venturi constriction 26 is connected to the passage entrance end enlargement 22 and the discharge end of the smaller constriction 27 is connected to the passage discharge enlargement 23, with the discharge end of the larger constriction connected to the entrance end of the smaller constriction at 28. A pair of separate ducts 29 and 30 are connected directly respectively to the sides of the constrictions 26 and 27 between their entrance and discharge ends.

Since the embodiment of the velocity gage apparatus of the present invention illustrated in the drawings is to be provided for versatile gaging operation with respect to various production design, it is formed to be readily connected into and disconnected from the velocity circuit. For this purpose, the Venturi means or structure 12 may include a casing 31 having a cylindrical blind hole 32 provided therein to serve as a receptive chamber suitably closed by a removable fluid-tight closure 33, which may be in the form of a tapered screw plug threadably engaged in an internally-threaded tapered mouth 34 of the receptive chamber and suitably gasketed thereto by any conventional gasketing means, such as an O-ring 35. The inner end of closure plug 33 closes the outer end of the Venturi through flow passage entrance enlargement 22. A portion of the supply conduit means 10 includes a channel 36 connecting the hose 20 to the receptive chamber 32 and a duct 37 in the Venturi unit 21 connects this channel to the entrance chamber 22. Another channel 38 extends through a sidewall of the casing 31 from the chamber 32 to serve as a discharge outlet and, for this purpose, is aligned with another duct 39 extending from the discharge chamber 23 through the Venturi body 21.

Suitable discharge conduit means may be in the form of a hose 40 which connects the discharge channel 38 to a nozzle supply bore 41 in the gaging member or head 11, with this bore communicating with branching bores 42 leading to discharge orifices of nozzles 43. Since the gaging member 11 may be of conventional construction no further descriptive details need be recited here.

It is desirable, as has been indicated above, that the flow circuit of such gaging apparatus be provided with a zero setting valve for a purpose hereinafter explained in connection with a recital of a typical operation of the apparatus illustrated in the drawings. Accordingly, such a zero setting valve may be located at 44 and in the form of a pin valve having a threaded shank 45 threadably engaged in an internally threaded hole 46 in the casing 31 leading to the receptive chamber 32. The discharge chamber 23 in the Venturi unit 21 may be partially closed by a sleeve 47 having a bore 48 through which the inner end of the valve pin extends with a sliding fit. The tapered tip 49 of this inner valve pin end extends to cooperation with a duct 50 communicating the discharge chamber 23 by way of a casing channel 51 to atmosphere.

The casing 31 is provided with means which suitably supports a float-equipped fluid column meter 13 that comprises an elongated, upright rotameter tube 52 having a longitudinal bore 53 linearly tapered with its smaller end 54 located at the bottom and flow connected to the side duct 29 of the larger Venturi constriction 26. For this purpose, the casing 31 may be provided with a gasketed socket 55 in which the bottom end 56 of the column meter tube 52 is fitted in a fluid-tight manner and with the side duct 29 communicating with its tapered bore 53. The top end 57 of the column meter tube 52, in which is defined the top larger end 58 of the tapered bore 53, is suitably mounted into a gasketed socket 59 provided in the under side of a capping head 60. The head 60 is provided with a passage 61 which is connected to the tube bore top end 58 and in turn is connected to bore 62 of a rotameter return flow tube 63 that is supported on the casing 31, such as by having its smaller end fitted into a socket 64, with return tube bore 62 communicated by side duct 30 to the smaller Venturi constriction 27. The column meter tube 52 is transparent for the purpose of observing the position therein of a float 65, which may be in the form of a floatable bob of plastic, aluminum or other suitable light weight material that will be supported by an updraft of air flowing through the column meter tube bore 53. For this purpose the column meter tube 52 may be formed of transparent glass while the return tube 63 may be formed of suitable opaque plastic. The upper end of the column meter tube 52 and the capping head 60 may cooperatively support a bumper stem 66 to limit the rise of the floatable bob 65, with suitable provision for flow of fluid or air past this stem.

It will thus be understood from FIG. 1, and particularly from the detailed showing in FIG. 2, that the Venturi unit 21 is removable from the casing chamber 32 by unscrewing the closure plug 33 and withdrawing this unit. This permits replacement thereof by another Venturi unit provided with Venturi constrictions of different diameters to adapt this velocity gaging system to another particular service. For example, as is indicated in FIG. 2 by the dotted lines and by the dot-dash lines such differing Venturi constrictions 126 and 127, and 226 and 227 may be substituted for the Venturi constrictions 26 and 27 shown in full lines therein. A suitable elongated linear scale will be associated with the float-equipped column meter tube 52, such as by supporting it on the casing structure immediately adjacent this tube. Such scale will be provided with a pair of slidably adjustable tolerance markers. The embodiment shown in FIGS. 3, 4 and 5 illustrate such scale and tolerance markers equipment.

In the structural form of the system of FIGS. 1 and 2 as is illustrated in FIGS. 3 to 5 incl. the casing means 131 is provided with the Venturi unit-receiving chamber in the form of an elongated symmetrically-shaped and stepped tubular socket 132 having an internally-threaded mouth 134 through which the Venturi unit 121 is inserted. The fluid-tight closure for this socket is in the form of a capping plug 133 which is threadably mounted in the internally-threaded socket mouth 134 for removably closing the latter. As will be best understood from FIG. 4 the Venturi unit 121 is in the form of an elongated body having the selections thereof coaxially arranged and substantially cylindrical in cross-section with the external shape of this body being substantially symmetrical for operative insertion into the stepped chamber socke 132 in any radial orientation of this body. The Venturi body 121 preferably is made in two parts for facilitating production, one part 221 constituting the main Venturi means and the other part 321 serving as an engageable extension to facilitate removal of the Venturi unit for replacement. As will be noted from FIG. 3 the plugging cap 133 has an internal socket 70 in which the Venturi unit extension 321 is housed with clearance, so that the top end 71 of the latter may extend above the adjacent face of the casing structure. This top end 71 of the Venturi unit extension is defined as a lifting head by means of an annular groove 72. The supply duct for the Venturi unit 121 is provided as a transverse hole 137 in the Venturi extension 321, and it is supplemented by an axial bore 73 extending from this cross hole out through the head 71. The entrance enlargement for the through passage of the Venturi unit 121 is partially provided by a counterbored socket 122 at the bottom of an internally-threaded sleeve section 74 of extension element 321 which is threadably engaged over an externally-threaded end section 75 of the Venturi body element 221.

The Venturi body element 221 of FIG. 4 is provided with the through flow passage by means of a counterbored or stepped axial bore having a relatively large upstream section 222 which supplements the counterbored socket 122 in the extension element 321 to provide the entrance compartment. The next largest section of the axial bore in the Venturi element 221 constitutes the largest Venturi constriction section 124 which serves as the first Venturi constriction 326. An annular groove or channel 76 in the outer surface of the Venturi element 221 opposite the Venutri constriction section 124 provides a flow clearance communicated to the constriction 326 by a radial duct 129. The smallest Venturi constriction section 125 of the axial bore in the Venturi element 221 provides the smaller Venturi constriction 327 and it is surrounded by an annular groove or channel 77 to serve as a flow clearance communicated to this constriction by a radial duct 130. The terminal end portion 139 of the axial bore in the Venturi element 221 serves as the discharge passage connected to the discharge conduit means which leads to the gaging member.

Intermediate the radial duct 129 and the supply hole 137 the Venturi element 221 is provided with an annular recess 78 in which is seated an O-ring gasket 79. A similar annular recess 80 intermediate the radial ducts 129 and 130 carries a gasketing O-ring 81, and the tip end of this Venturi element is provided with a third recess in the form of an annular rabbet or relief 82 in which is seated a third gasketing O-ring 83. The stepped walls of the chamber socket 132 are of I.D.'s at points opposite the O-rings 79, 81 and 83 which are slightly less than the O.D.'s of the respective O-rings 79, 81 and 83, so that when the Venturi unit 121 is forced into this socket these gasketing O-rings are confined under sufficient compression to isolate the supply cross hole 137, the side ducts 129 and 130 and the terminal bore portion 139 from each other. Opposed portions of the walls of this chamber socket 132 and of the inserted Venturi body or unit 121 provide therebetween annular fluid supply clearances respectively about the Venturi extension element 321 and its cross hole 137, and the pair of radial side ducts 129 and 130. It will be seen from FIG. 3 that such clearance for the entrance cross hole 137 and its supplemental axial bore 73 is provided by forming the socket 70 in the cap 133 in a diameter greater than the O.D. of this extension, as well as by forming the section of the chamber socket opposite the supply duct 136 in greater diameter. The annular grooves or channels 76 and 77 in the Venturi element 221 provides such clearance for the radial side ducts 129 and 130.

In the FIGS. 3 to 5 incl. structural form the casing block 131 is provided with a transverse channel section 84 leading from the clearance 76 to another channel section 85 communicating the former with a gasketed socket 155 in which the bottom end 56 of the float-equipped column meter tube 52 is seated and supported. Thus, casing channel 84–85 communicates the side duct 129 of the Venturi constriction 326 with the smaller bottom end of the tapered bore 53 of the column meter tube 52. Another transverse channel section 86 communicates the annular clearance 77 with a channel section 87 leading to a gasketed socket 164 in the top of the casing block 131 for communicating the Venturi side duct 130 to the bore 62 of rotameter return conduit 63.

As will be seen in FIG. 3, the discharge end section 139 of the Venturi body axial bore is communicated to conduit means leading to the gaging member by discharge channel sections 88 and 89, with the latter communicating with a hose connector fitting 90 to which a discharge hose 91 (indicated in broken lines) may be connected for supply of the pressurized air to the gaging member. The discharge channel section 88 also communicates with a bypass or bleed channel 92 in the casing block 131 and this bypass channel leads to a vent 93 communicated with the atmosphere, through which flow of vented air is controlled by a valve element 149 of zero setting valve 144.

Instrument superstructure 95 of the FIGS. 3 to 5 incl. construction supports the capping head 160 (see FIG. 5) of the rotameter that in turn serves as a mount for the top ends of the float-equipped column meter tube 52 and the return tube 63 while providing a communicating cross duct therebetween. The superstructure 95 has a vertical face 96 located adjacent the float-equipped column meter tube 52 for removable support of an elongated scale strip 97. The scale strip 97 may be formed of relatively rigid plastic having some flexibility and is suitably removably mounted to the superstructure face 96, such as by means of a pair of top and bottom screws 98 and 198. The scale strip 97 is provided with plus and minus sections of a linear scale which has a mid-point mark "0" at 100. As indicated in FIG. 5 the plus scale section above "0" may be provided, for example, with division marks "1," "2," "3," and "4," the intervening divisions being subdivided into equal increments. The minus section of the scale 97 below "0" is a reversed duplicate of the plus section, carrying similar division and subdivision marks. The scale strip 97 slidably supports for vertical adjustment top and bottom tolerance markers 101 and 201, which define therebetween the span or range of the up and down floating movement of the indicating float or bob (shown at 65 in FIG. 1).

In preparation for operation of the embodiment of the gaging instrument of the present invention shown in the drawings the supply conduit means or hose will be connected to a suitable line of pressurized air, which may be at a pressure of between about 30 and 150 p.s.i. In order to assure that the air is free of water, oil and scale a suitable filter unit (not shown) should intervene the pressure regulator and the air supply line. The tolerance markers 101 and 201 may be spaced as desired. The minimum setting master ring 15, which has a hole 102 of a diameter that represents the minimum size of the hole to be gaged in work pieces is applied to the gaging head 11, such as in the manner indicated in dotted lines at 103 in FIG. 1. The pressurized air is then fed through the supply conduit means or hose 20 to obtain a minimum reading on the minus or lower section of the scale 97, indicated by the position of the float or bob 65 opposite thereof. This procedure is then repeated with the maximum setting master ring 16 which has a hole 104 of a diameter that sets the maximum limit of tolerance of the holes in the workpieces to be checked. The float or bob 65 will rise in the column meter tube bore 53 to give a top range reading on the plus section of the scale 97. If the total vertical movement of the float or bob 65 does not coincide with the desired maximum and minimum settings the magnification should be reduced or increased, as the case may be, by lowering or increasing the gage pressure with adjustment of the pressure regulator screw. If the total span or range is short the magnification must be increased and if it is long the magnification must be decreased in this manner. After such pressure adjustment the zero setting must be adjusted by means of the zero setting bleed valve (44 or 144) to recentralization of the gaging span determined in this manner. The instrument is then ready for use in checking holes in workpieces the diameters of which are to be maintained within such tolerance range.

When it is necessary to adapt the operation of the instrument to a specially designed production of workpieces which require a change in magnification this is accomplished not by replacing the float-equipped column meter tube 52 or its float 65, but simply by substituting a different Venturi unit (21 or 121) in the receptive chamber (32 or 132) and replacing the scale 97 with an appropriate scale, in the simple manners indicated above.

For a complete understanding of the pneumatic circuit schematically illustrated in FIG. 1 let it be assumed that the gaging nozzles 43 are completely blocked by structure located about the gaging member 11 in the broken line position 103. With the gaging nozzles completely restricted the velocity of air flow in the circuit will be zero when the zero adjustment valve is also closed. The pressure in each of the pair of Venturi sections 24 and 25 and the bypass through the rotameter tube 52 will be equal. Consequently, since there will be no pressure differential the air in the small Venturi section 25 will flow up through side duct 30 and tube bore 62, across through the connecting passageway 61 and down through the tapered rotameter tube bore 53 to be restricted by the float or bob which will be a rest in the bottom of the latter, as is indicated by the broken line arrows 104. The flow of air down through side duct 29 of the larger Venturi section 24 will be restricted by the bottom section of the float or bob 65, and the opposing pressure in the small Venturi section 25.

When the flow from the gaging member nozzles 43 is partially restricted by a surface of the workpiece while being gaged in the position 103, the float or bob 65 will come to rest at some elevated position in the tapered bore 53 of the rotameter tube, such as at the mid-position illustrated in FIG. 1. Under these conditions there will be some slight leakage of air, indicated by light weight full line arrows 105, up around the float or bob 65, flowing up from the large Venturi section 24 through side duct 29, indicated by heavy weight full line arrows 106. However, this flow will be opposed by the pressure from the small Venturi section 25, indicated by arrows 107, so that the amount of air flowing through the rotameter bypass from the large Venturi section 24 will be minimal. When the gaging nozzles 43 are unrestricted, a maximum air flow in the circuit will occur. In this instance the pressure differential between the two Venturi sections 24 and 25 will be at its greatest level. The pressure from the larger Venturi section 24 will force the float or bob 65 up against the bumper 66 in the top of the tube and there will be some leakage past the float into the cross-connecting passageway 61 to the small Venturi section 25. Again, this flow will be opposed by the pressure in the smaller Venturi section 25 and the total amount of air passing through the rotameter bypass into the through flow, Venturi constriction-equipped passage will be only a fraction of the total air flowing through the circuit.

It will thus be seen that in the embodiment illustrated by way of example in the drawings which operates on the velocity principle the primary air flows through a passage, successive sections of which provide a pair of succeeding Venturi constrictions, to the nozzles of the gaging member. A bypass is connected through an adjustable zero setting valve between this passage and the atmosphere ahead of the gaging member to allow a small portion of the flowing air to bleed to the atmosphere without passing through the gaging nozzles, and the rate of such bleed is employed to centralize the gaging span or range of up and down floating travel of the float or bob in the column meter tube at any particular pressure adjustment, so that the mid-point of this span coincides with the zero mark of the indicator scale. From each of the pair of Venturi constriction sections of the passage another bypass is provided, and the rotameter indicator is connected between this pair of bypasses so that the pressures created in these respective Venturi sections are so directed through the rotameter indicating tube as to oppose each other and create a differential reading on the indicator scale. When the gaging nozzles and zero setting valve are completely closed there will be no flow of pressurized air through the circuit of the gage, i.e., air flow is a zero velocity, and thus the two Venturi sections will be at the same pressure thereby creating a null position of the float or bob at the bottom of the column meter tube. As the gage nozzles are partially opened, as is the case in locating the body of a setting master or workpiece closely thereto but spaced slightly therefrom for limited flow of air from the nozzle to the atmosphere a differential in the pressures at the two Venturi sections is created and the float or bob will be lifted thereby to a position where the opposing pressures are balanced. This differential in pressure at the two Venturi sections, and the attendant rise of the float or bob in the column meter tube, will reach a maximum when there is no part or master piece located opposite the nozzles in flow restricting positions. The operation of the pneumatic circuit of this embodiment of the invention is confined strictly to measuments of velocities of the pressurized air flowing therethrough. The rotameter indicator provide a secondary or auxiliary metering effect in addition to the primary metering directly through the Venturi passage since the rotameter provides a bypass flow path between the pair of Venturi constrictions. When a specific combination of Venturi unit and gaging members are provided for the instrument the magnification can be expanded or contracted by a factor of at least two simply by increasing or decreasing operating pressure by adjustment of the pressure regulator. Since the indicator readings of the present gaging instrument are obtained from the differential pressure created by the velocity flow in the pneumatic circuit thereof slight fluctuations in the pressure of the pressurized fluid or air supply will not affect stability of the readings as readily as they would in other systems based on the back pressure and full through flow principles, thus assuring unusual long range stability of the readings provided by instruments of the present invention.

Many of the above indicated advantages may be realized by practice of the present invention with respect to a velocity circuit of the type taught in my prior U.S. Patent No. 2,779,188 of Jan. 29, 1957. In this circuit the pair of Venturi constrictions are connected in parallel to the controllable pressure source of pressurized fluid with the discharge flow from these constrictions being separately supplied through separate parallel flow paths to separate nozzle systems of the gaging member. In such a circuit the Venturi constrictions may be of equal cross-sectional area or diameter. As in the previous embodiment illustrated in the present drawings the rotameter will be connected between the side ducts which are communicated respectively to this pair of Venturi constrictions. The Venturi unit which includes such flow isolated Venturi constrictions is also to be made readily removable for easy substitution by other such units having constrictions of different dimensions for change of magnification demanded by differing special workpiece designs, as is also the rotameter scale in the manner indicated previously. Such ready substitutions of Venturi units may be assured by housing the Venturi unit in an easily openable chamber of casing means equipped with the separated flow connections for the mutually isolated Venturi constrictions demanded by this embodiment.

It will thus be understood that in such differing embodiments wherein the pair of Venturi constrictions are connected in successive order for series flow of supplied pressurized fluid therethrough, as in the present drawings, or in parallel for simultaneous isolated flow thereof in isolated branch output circuits, the pneumatic circuits of the gage apparatus of the present invention are characterized by the following features. The Venturi means includes a pair of through flow passage sections each providing one of a pair of constrictions having an entrance end and a discharge end. Supply conduit means connects a controllable pressure source of pressurized fluid to the entrance ends of the pair of Venturi constrictions. Discharge conduit means connects the discharge ends of the Venturi constrictions to nozzle means of a gaging member. A pair of separate bypass ducts are respectively connected directly to a side of one of the pair of Venturi constrictions between the entrance and discharge ends of the latter. A rotameter is employed in the pneumatic circuitry which has the smaller bottom end of the tapered bore of the float-equipped upright tube flow connected to the side duct of the one of the pair of Venturi constrictions which is of a cross-sectional area not less than that of the other. And the top larger end of the float-equipped tube bore is flow connected to the side duct of this other Venturi constriction. A suitable scale of the linear type is associated with the rotameter, tapered bore tube for giving indicator readings within a range of this scale of the elevational position of a floatable bob buoyed in the tapered bore.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. Fluid gage apparatus for gaging and comparing dimensions of workpieces comprising, in combination:
    (a) a controllable pressure source of pressurized fluid,
    (b) Venturi means including a pair of through flow passage sections each providing one of a pair of constrictions with each constriction having an entrance end and a discharge end,
    (c) supply conduit means connecting said source of pressurized fluid directly to the entrance ends of the constrictions of said through flow passage sections for through flow,
    (d) a gaging member equipped with nozzle means to be opposed to surfaces of workpieces being gaged with a small intervening gap which meters rate of direct flow of the pressurized fluid through the pair of Venturi constrictions from the pressurized fluid source to the gaging member nozzle means,
    (e) additional discharge conduit means connecting the discharge ends of the constrictions of said through flow passage sections directly to the gaging member nozzle means,
    (f) a pair of separate ducts each connected directly to a side of one of said constrictions between the entrance and discharge ends of the latter; and
    (g) a float-equipped fluid column meter comprising an elongated upright tube having a longitudinal bore linearly tapered with its smaller end located at the bottom and flow connected to the side duct of the one of said constrictions which is of a cross sectional area not less than that of the other of said constrictions and with the top larger end of this bore flow connected to the side duct of the other constriction for diversionary flow up through said tube of a fraction of the pressurized fluid, said tube having a scale associated therewith and carrying in its tapered bore a floatable bob for indicating cooperation with a range of said scale.

2. In a fluid gage apparatus for gaging and comparing dimensions of workpieces comprising:
(a) a controllable pressure source of pressurized fluid,
(b) a gaging member equipped with nozzle means,
(c) Venturi means including a pair of through flow passage sections each providing one of a pair of constrictions with each constriction having an entrance end and a discharge end,
(d) a pair of separate ducts each connected directly to a side of one of said constrictions between the entrance and discharge ends of the latter,
(e) supply conduit means connecting said source of pressurized fluid to the entrance ends of the constrictions of said through flow passage sections for through flow of the pressurized fluid,
(f) additional discharge conduit means connecting the discharge ends of the constrictions of said through flow passage sections to the gaging member nozzle means, and
(g) a float-equipped fluid column meter comprising an elongated upright tube having a longitudinal bore linearly tapered with its smaller end located at the bottom and flow connected to the side duct of the one of said constrictions which is of a cross-sectional area not less than that of the other of said constrictions and with the top larger end of this bore flow connected to the side duct of the other constriction for diversionary flow up through said tube of a fraction of the pressurized fluid, said tube having a scale associated therewith and carrying in its tapered bore a floatable bob for indicating cooperation with a range of said scale; the improvement which comprises
(h) casing means having a receptive chamber closed by a removable fluid-tight closure with said Venturi means being in the form of removable and replaceable structure housed in said chamber, said casing and said Venturi means structure having cooperatively communicating passages for said flow connections of said supply and discharge conduit means to said Venturi through flow passage sections and said side ducts to said fluid column meter.

3. The fluid gage apparatus as defined in claim 1 in which said pair of through flow passage sections are arranged in successive through flow order between said supply conduit means and said discharge conduit means with the constriction of one being larger in cross-section than that of the other and connected directly to said supply conduit means to receive the pressurized fluid therefrom and deliver it to the small constriction for delivery in turn by the latter directly to the discharge conduit means, said column meter bob-carrying tube having its smaller end connected directly to the larger constriction by the side duct of the latter and its larger end connected directly to the smaller constriction by the side duct of the latter.

4. In a fluid gage apparatus for gaging and comparing dimensions of workpieces comprising:
(a) a controllable pressure source of pressurized fluid,
(b) a gaging member equipped with nozzle means,
(c) Venturi means including a pair of through flow passage sections each providing one of a pair of constrictions with each constriction having an entrance end and a discharge end with said pair of through flow passage sections being arranged in successive through flow order and the constriction of one thereof being larger in cross-section than that of the other, the discharge end of the larger constriction being connected to the entrance end of the smaller constriction,
(d) a pair of separate ducts each connected directly to a side of one of said constrictions between the entrance and discharge ends of the latter,
(e) supply conduit means connecting said source of pressurized fluid to the entrance end of said larger constriction for reception by the latter of the pressurized fluid and delivery of it to the smaller constriction,
(f) additional discharge conduit means connecting the discharge end of the smaller constriction to the gaging member nozzle means for delivery of the pressurized fluid to the latter,
(g) a float-equipped fluid column meter comprising an elongated upright tube having a longitudinal bore linearly tapered with its smaller end located at the bottom and flow connected to the side duct of the larger constriction and with the top larger end of this bore flow connected to the side duct of the smaller constriction for diversionary flow up through said tube of a fraction of the pressurized fluid, said tube having a scale associated therewith and carrying in its tapered bore a floatable bob for indicating cooperation with a range of said scale; the improvement which comprises
(h) said Venturi means being in the form of a removable and replaceable unit with said apparatus providing casing means defining a chamber closed by a removable fluid-tight closure in which said Venturi unit is housed, said Venturi unit being provided with a through flow passage in which said successive constrictions are located with the entrance end of said passage ahead of said constrictions being flow connected to said pressurized fluid source by a portion of said supply conduit means in the form of a channel in said casing means leading to said chamber and with the discharge end of said constriction-equipped passage being flow connected to said gaging member by a portion of said discharge conduit means in the form of another channel in said casing means leading from said chamber, said casing means being provided with means supporting the smaller end of said column meter tube and a channel communicating said tube smaller end to said chamber at a point of flow connection to the side duct of the larger constriction, conduit means being provided which connects the larger end of said column meter tube through said casing means to said chamber at another point of flow connection to the side duct of the smaller constriction.

5. The fluid gage apparatus as defined in claim 4 in which said chamber is in the form of an elongated symmetrically-shaped tubular socket formed in said casing means having a mouth through which said Venturi unit is inserted with said fluid-tight closure then removably closing the socket mouth, said Venturi unit is in the form of an elongated body having the sections thereof coaxially arranged and substantially cylindrical in cross-section with the external shape of said body being substantially symmetrical for operative insertion into the chamber socket in any radial orientation of said body and with said symmetrical body being provided with an axial bore serving as the constriction-equipped passage; opposed portions of the walls of said socket and of said inserted Venturi body providing therebetween an annular fluid supply clearance at the entrance end of said bore communicated with said casing supply channel, and a pair of axially-separated annular clearances axially spaced from said fluid supply clearance respectively communicating said constriction side ducts to said channel leading to the smaller end of said column meter tube and the conduit means leading from the larger end of the latter, the discharge end of said bore being communicated to said discharge channel; and axially-spaced gasketing means are intervened between the walls of said socket and said Venturi body which isolate the annular clearances for said constriction side ducts from each other and from said fluid supply clearance and the area of the communication of said bore discharge end to said discharge channel.

6. The fluid gage apparatus as defined in claim 5 in which said Venturi body is provided with axially-spaced annular recesses with said gasketing means being in the form of elastomeric O-rings seated in said annular recesses.

References Cited
UNITED STATES PATENTS

| | | | |
|---|---|---|---|
| 783,486 | 2/1905 | Tilden | 73—202 |
| 2,465,035 | 3/1949 | Polk et al. | 73—37.9 |
| 2,513,374 | 7/1950 | Stead et al. | 73—37.9 |

LOUIS R. PRINCE, *Primary Examiner.*

W. A. HENRY, *Assistant Examiner.*

U.S. Cl. X.R.

73—202

PO-1050
(5/69)

UNITED STATES PATENT OFFICE
CERTIFICATE OF CORRECTION

Patent No. 3,443,417        Dated June 18, 1969

Inventor(s) Franklin Meyer, Jr.

It is certified that error appears in the above-identified patent and that said Letters Patent are hereby corrected as shown below:

Column 2, line 66, for "that" read --than--; column 2, line 69, for "plurality alongside" read --plurality thereof alongside--; column 3, line 22, for "rotometer" read --rotameter--; column 3, line 44, for "which" read --which may--; column 3, line 51, for "construtcitons" read --constructions--; column 5, line 73, for "selections" read --sections--; column 5, line 76, for "socke" read --socket--; column 6, line 32, for "Venutri" read --Venturi--; column 7, line 38, for "As indicated" read --As is indicated--; column 8, line 31, for "connectiing" read --connecting--; column 8, line 33, for "a" read --at--; column 8, line 38, for "small" read --smaller--; column 9, line 16, for "a" read --at--; column 9, line 22, for "nozzle" read --nozzles--; column 9, line 34, for "provide" read --provides--; column 9, line 39, for "members" read --member--; column 11, line 54, for "small" read --smaller--; column 11, line 73, for "construction" read --constriction--.

SIGNED AND SEALED

MAR 17 1970

(SEAL)
Attest:

Edward M. Fletcher, Jr.
Attesting Officer

WILLIAM E. SCHUYLER, JR.
Commissioner of Patents